US005651559A

United States Patent [19]
Liland et al.

[11] Patent Number: 5,651,559
[45] Date of Patent: Jul. 29, 1997

[54] PROTECTIVE GUARD FOR A TRAILER HITCH HOUSING

[76] Inventors: David K. Liland, 301 E. Front St., Unit 9, New Bern, N.C. 28560; Robert L. Liland, 406 Tar Landing, New Bern, N.C. 28562

[21] Appl. No.: 489,644

[22] Filed: Jun. 12, 1995

[51] Int. Cl.$^6$ .................................................. B60D 1/60
[52] U.S. Cl. ........................................ 280/507; 280/511
[58] Field of Search ............................... 280/507, 511, 280/477; 150/166, 154; D12/106, 162; 296/41; 293/142

[56] References Cited

U.S. PATENT DOCUMENTS

| D. 316,069 | 4/1991 | Yocum | D12/162 |
|---|---|---|---|
| 3,012,797 | 12/1961 | Manting | 280/507 |
| 3,237,969 | 3/1966 | Geresy | 280/507 |
| 3,679,234 | 7/1972 | Colliau | 280/511 |
| 3,780,546 | 12/1973 | Longenecker | 280/507 |
| 4,581,908 | 4/1986 | Bulle et al. | 280/507 |
| 4,657,275 | 4/1987 | Carroll . | |
| 4,781,394 | 11/1988 | Schwarz et al. | 280/477 |
| 4,852,902 | 8/1989 | Young et al. | 280/507 |
| 4,925,205 | 5/1990 | Villalon et al. | 280/507 |
| 4,961,590 | 10/1990 | Davenport | 280/477 |
| 5,035,938 | 7/1991 | Truett | 150/166 |
| 5,037,122 | 8/1991 | Beckerer, Jr. | 280/507 |
| 5,080,386 | 1/1992 | Lazar | 280/477 |
| 5,114,170 | 5/1992 | Lanni et al. | 280/477 |
| 5,328,199 | 7/1994 | Howe | 280/477 |
| 5,407,219 | 4/1995 | Chiu | 280/507 |
| 5,575,494 | 11/1996 | DeVries . | |

FOREIGN PATENT DOCUMENTS

| 2097306 | 3/1972 | France | 280/507 |
|---|---|---|---|
| 2850424 | 5/1979 | Germany | 280/511 |
| 3233813 | 11/1983 | Germany . | |
| 3635730 | 6/1988 | Germany | 280/507 |
| 2255538 | 11/1992 | United Kingdom | 280/507 |
| 09402913 | 12/1994 | WIPO | 280/507 |

*Primary Examiner*—Anne Marie Boehler
*Attorney, Agent, or Firm*—Bell, Seltzer, Park & Gibson, P.A.

[57] ABSTRACT

The protective guard for protecting against damage to a vehicle during a trailer coupling operation includes an impact absorbing guard body covering at least a portion of the outer surface of the longitudinal end portion of a trailer hitch housing extending away from the trailer. The guard body includes a compressible, resilient material such that the guard body is capable of cushioning the impact of a vehicle with a trailer hitch housing. The guard body thereby protects the vehicle from inadvertent damage. The guard body includes a concave inner surface defining an arcuate slot extending inwardly into the guard body. The arcuate slot is adapted to receive an outwardly projecting, generally horizontal flange which extends about an exterior portion of the longitudinal end portion of the trailer hitch housing. The arcuate slot can be adhered to or frictionally engaged with the outwardly extending flange such that the guard body is secured to the longitudinal end portion of the trailer hitch housing and covers at least a portion of the outwardly extending flange. The guard body can also be comprised of a compliant material, such as an elastomeric material, capable of elastically deforming to a plurality of different shapes such that the compliant guard body can adaptively cover at least a portion of the longitudinal end portions of a number of trailer hitch housings having a variety of different shapes.

22 Claims, 2 Drawing Sheets

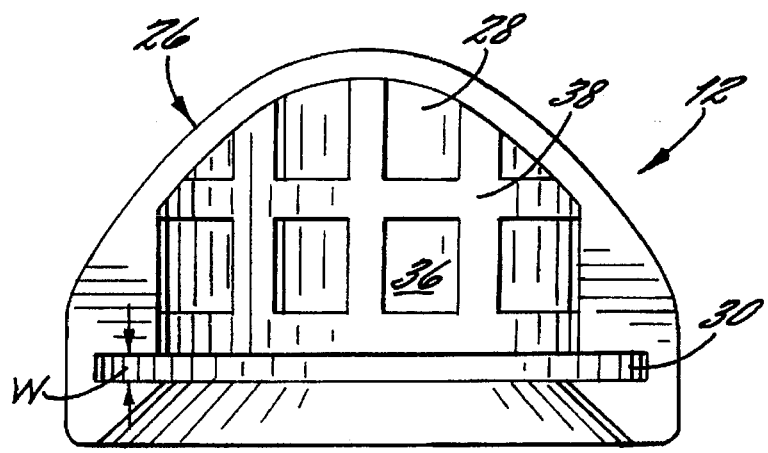
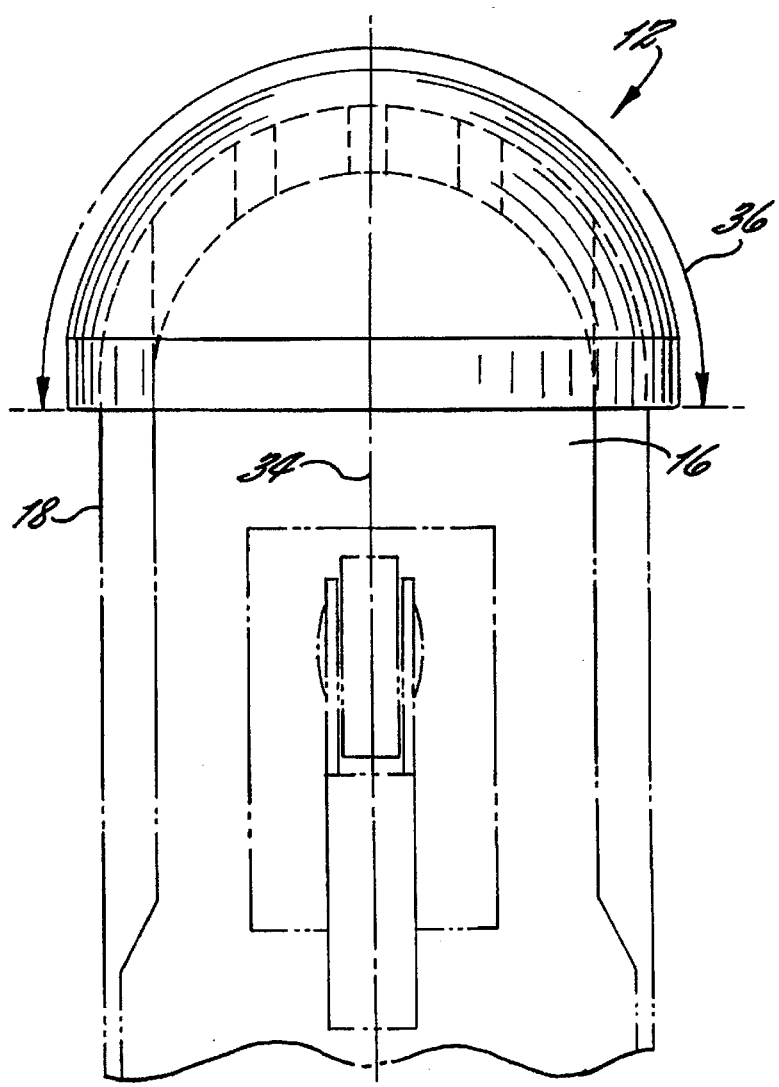

PROTECTIVE GUARD FOR A TRAILER HITCH HOUSING

FIELD OF THE INVENTION

The present invention relates generally to an apparatus for protecting against damage to vehicles during trailer coupling operations and, more particularly, to protective guards for protecting against damage to a vehicle during trailer coupling operations.

BACKGROUND OF THE INVENTION

Trailers are commonly used for a wide variety of applications, such as house trailers and boat trailers. Trailers generally include a trailer hitch housing which extends longitudinally from the front end of the trailer. A trailer hitch housing typically includes a female coupling element defined by a surrounding metallic housing. The trailer hitch housing also generally includes a flanged portion extending outwardly from exterior portions of the longitudinal end portion of the trailer hitch housing which extends away from the trailer. While trailer hitch housings may have a variety of shapes and sizes due to the type and anticipated load requirements of the trailer, the longitudinal end portion of most trailer hitch housings, including the outwardly extending flange portion, of most trailer hitch housings are generally fairly similar, if not identical, among a large number of trailers.

A trailer is conventionally hitched to a vehicle by raising the trailer hitch housing to a height which slightly exceeds the height of a corresponding male hitch, typically a ball-shaped hitch, that is mounted to or extends from the rear bumper of the vehicle. The driver of the vehicle can then back the vehicle toward the trailer while attempting to locate the hitch as near as possible to the female coupling element of the trailer hitch housing. However, the hitch and the trailer hitch housing and, in particular, the female coupling element of the trailer hitch housing cannot normally be seen by the driver during at least the final phase of the backing movement. Since the hitch and the trailer hitch housing are out of sight during the final phase of the backing movement, the driver may periodically stop the vehicle, walk behind the vehicle and observe the relative position of the hitch and the trailer hitch housing prior to further backing the vehicle. In order to properly align the hitch with the female coupling element of the trailer hitch housing, the driver may be required to stop the vehicle several times to observe the relative positions of the hitch and the trailer hitch housing, thereby frustrating the driver.

In other instances, the driver of the vehicle can be guided by a spotter who stands in position to view both the vehicle's hitch and the trailer hitch housing. The spotter advises the driver, such as by hand signals or shouted advice, as to further movement which should be taken in order to properly align the hitch and the female coupling element of the trailer hitch housing. For example, the spotter may advise the driver to back the vehicle to the right or to the left relative to the trailer hitch housing in order to properly align the hitch and the trailer hitch housing. Even with the assistance of a spotter, however, the alignment of the hitch with the trailer hitch housing can be a time consuming and frustrating experience.

Notwithstanding these precautions, such as periodically stopping the vehicle and observing the relative positions of the hitch and the trailer hitch housing or such as employing a spotter to advise the driver of further backing movements, the driver of the vehicle oftentimes continues to back the vehicle until the outwardly extending flanged portion of the trailer hitch housing contacts the bumper of the vehicle. For example, the spotter may fail to advise the driver to halt the vehicle until a time at which the driver is unable to halt backing operations prior to contacting the outwardly extending flange portion of the trailer hitch housing. Alternatively, a driver who has previously observed the relative positions of the hitch and the trailer hitch housing may improperly judge the remaining distance therebetween upon resuming backing operations such that the vehicle may contact the trailer hitch housing.

While the contact between the bumper of the vehicle and the outwardly extending flange portion of the trailer hitch housing informs the driver of the vehicle that the hitch is aligned with or at least in the vicinity of the female coupling element of the trailer hitch housing, the contact also inevitably creates a dent or scratch in the bumper of the vehicle. Over time, and following repeated trailer hitch coupling operations, a number of dents or scratches can be created in the bumper due to repeated contact between the bumper of the vehicle and the outwardly extending flange portion of the trailer hitch housing. These dents and scratches not only are unattractive, but the dents and scratches also decrease the value of the vehicle.

The amount by which such dents and scratches decrease the value of the vehicle has rapidly increased in recent years as the price of the vehicles which commonly tow trailers has risen. For example, sport utility vehicles which are oftentimes tow trailers can typically cost upwards of $20,000 and, in many instances, upwards of $30,000. Accordingly, the cost of repairing or replacing a scratched and dented bumper of such sport utility vehicles is also relatively expensive.

Due, at least in part, to the increasing cost of the vehicles which tow trailers, the owners of the vehicles have begun to retain or drive the vehicles for a longer period of time prior to reselling the vehicles and purchasing a new or a different vehicle. In turn, this increases the total number of dents and scratches which the bumper accumulates over the extended period of time in which the owner drives the same vehicle and tows trailers therewith. Accordingly, while the vehicle may have originally been relatively expensive, the vehicle can have a bumper with increased numbers of dents and scratches, therefore decreasing the attractiveness and value of the vehicle.

The problem of bumper dents from trailers has been addressed in varying manners in an attempt to minimize the resultant bumper damage. In particular, various methods have been proposed to facilitate the coupling of a trailer hitch housing to a hitch. See, for example, U.S. Pat. No. 5,114,170 to Joseph Lanni, et al which issued Jan. 29, 1991 and U.S. Pat. No. 5,080,386 to Joseph Lazar which issued Jan. 14, 1992. These trailer coupling devices are relatively complex, however, and require a number of components to be mounted either to the vehicle or to the trailer hitch housing.

In addition, a hitch guard is disclosed in U.S. Pat. No. 3,012,797 to Jack F. Manting which issued Dec. 12, 1961 and is assigned to Manting Tool and Die Company. The hitch guard is adapted for attachment by a hitch to a rear bumper of a vehicle. The hitch guard includes an upwardly extending generally U-shaped rod connected to a baseplate which can be connected about the hitch. The U-shaped hitch guard is configured to receive the longitudinal end portion of the trailer hitch housing while preventing the hitch from various unintended contacts with other vehicles. For example, the hitch guard of the Manting '797 patent protects the hitch from unintended contact with another vehicle during parking or pushing of the vehicle. Accordingly, the hitch guard protects the hitch, but not necessarily the bumper from inadvertent damage.

Finally, German Patent No. DE 3233813 to Günter Biedenbach discloses a plastic covered foam pad for protecting a vehicle bumper. As disclosed in the German patent, the plastics covered foam pad can be mounted to a vehicle bumper, such as by plastic clips, in order to protect the bumper. However, the plastic covered foam pad of the Biedenbach '813 patent can remain affixed to the vehicle bumper, thereby also potentially harming the appearance of the vehicle. In addition, a trailer owner may have several vehicles with which to tow the trailer. In order to protect each of the vehicles' bumpers according to the Biedenbach '813 patent, the trailer owner must mount a plastics covered foam pad on each of the vehicles or shift the plastics covered foam pad from vehicle to vehicle so that the foam pad is mounted on the particular vehicle which is going to tow the trailer at any particular time.

SUMMARY OF THE INVENTION

It is therefore an object of the present invention to provide an improved protective guard for protecting the bumper of a vehicle from inadvertent damage during trailer coupling operations.

It is another object of the present invention to provide a protective guard for a trailer hitch housing which does not mount on the vehicle and, consequently, does not affect the appearance of a vehicle.

These and other objects are provided, according to the present invention, by a protective guard for protecting against damage to a vehicle during trailer coupling operations which includes an impact absorbing guard body for covering at least a portion of the outer surface of a longitudinal end portion of a trailer hitch housing extending away from a trailer. The guard body is formed of a compressible, resilient material, such as polyurethane, so that the guard body is capable of cushioning the impact of a vehicle with the trailer hitch housing. Accordingly, the vehicle and, more particularly, the bumper of a vehicle can be protected from inadvertent damage.

In one advantageous embodiment, the guard body is a compliant guard body formed of an elastomeric material capable of elastically deforming to a plurality of different shapes. The plurality of different shapes into which the compliant guard body is capable of elastically deforming match respective ones of a plurality of different predetermined shapes of the outer surfaces of the longitudinal end portions of a plurality of trailer hitch housings. Accordingly, a single compliant guard body of this embodiment of the present invention is capable of adaptively covering at least a portion of the longitudinal end portions of a plurality of trailer hitch housings having a variety of different shapes.

The guard body of this invention includes a concave inner surface having a shape and size which are selected to match the predetermined shape and size, respectively, of at least a portion of the longitudinal end portion of a trailer hitch housing. An arcuate slot is formed in the concave inner surface of the guard body and extends inwardly into the guard body from the inner surface thereof. The arcuate slot is adapted to receive at least a portion of an outwardly projecting, generally horizontal flange which extends about an exterior portion of the longitudinal end portion of the trailer hitch housing.

In one embodiment, the arcuate slot has a predetermined width at least as small as the thickness of the outwardly projecting flange of the trailer hitch housing. Accordingly, the arcuate slot defined by the guard body of this embodiment is adapted to receive and frictionally engage at least a portion of the outwardly extending flange. As a result, the guard body can be frictionally secured to the longitudinal end portion of the trailer hitch housing and covers at least the longitudinally extending portion of the outwardly extending flange. The guard body is thus mounted in a position to cushion the impact of a vehicle with the trailer hitch housing and to protect the vehicle from inadvertent damage.

The protective guard of one embodiment can include an adhesive disposed between the guard body and the outer surface of at least a portion of the longitudinal end portion of the trailer hitch housing. Accordingly, the arcuate slot need not frictionally engage the outwardly extending flange since the adhesive can secure the guard body of this embodiment to the trailer hitch housing.

According to one embodiment, the impact absorbing guard body is capable of covering a predetermined arcuate portion of the outer surface of the longitudinal end portion of the trailer hitch housing. For example, the predetermined arcuate portion can define an arc angle of about 180°. Advantageously, the arcuate portion of the outer surface of the longitudinal end portion of the trailer hitch housing which the guard body is capable of covering is centered about the longitudinal axis defined by the longitudinal end portion of the trailer hitch housing. Accordingly, the protective guard can cushion the impact of a vehicle with a trailer hitch housing even in instances in which the vehicle is turned with respect to the trailer and, more particularly, with respect to the longitudinal axis defined by the trailer hitch housing.

The concave inner surface of the guard body can also define at least one recessed portion and, more typically, a plurality of recessed portions extending inwardly into the guard body from the inner surface of the guard body. In this embodiment, the plurality of recessed portions can define a plurality of ribs extending between respective ones of the plurality of recessed portions. The recessed portions defined by the concave inner surface of the guard body enhance the compressibility of the guard body by permitting the outer surface of the guard body to flex inwardly so as to further cushion the impact of a vehicle with a trailer hitch housing.

Accordingly, the protective guard of the present invention effectively protects the vehicle from inadvertent damage occasioned by impacting a trailer hitch housing, such as during trailer coupling operations. Therefore, the bumper of the vehicle will not be marred, such as by being scratched or dented, and the resulting appearance of the vehicle will be maintained, thereby protecting the investment of the vehicle's owner.

Additionally, the protective guard of the present invention is simple to install on the trailer hitch housing. By mounting the protective guard on the longitudinal end portion of a trailer hitch housing, the towing vehicle need not be modified so that the appearance of the vehicle is adversely affected. In addition, the protective guard of the present invention is adapted to mate to conventional trailer hitch housings and, consequently, does not require a specially designed trailer hitch housing. The protective guard also does not limit the hitches to which the trailer hitch housing can mate. Thus, the owner of the towing vehicle need not purchase a different hitch or otherwise exchange parts in order tow a trailer having a protective guard of the present invention mounted thereto.

BRIEF DESCRIPTION OF THE DRAWINGS

FIG. 3 is a perspective view of the concave inner surface of a protective guard according to one embodiment of the present invention illustrating the arcuate slot formed in the concave inner surface of the guard body.

FIG. 4 is a plan view of a protective guard according to one embodiment of the present invention secured to the longitudinal end portion of a trailer hitch housing and illustrating the arcuate portion of the longitudinal end portion which the protective guard covers.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
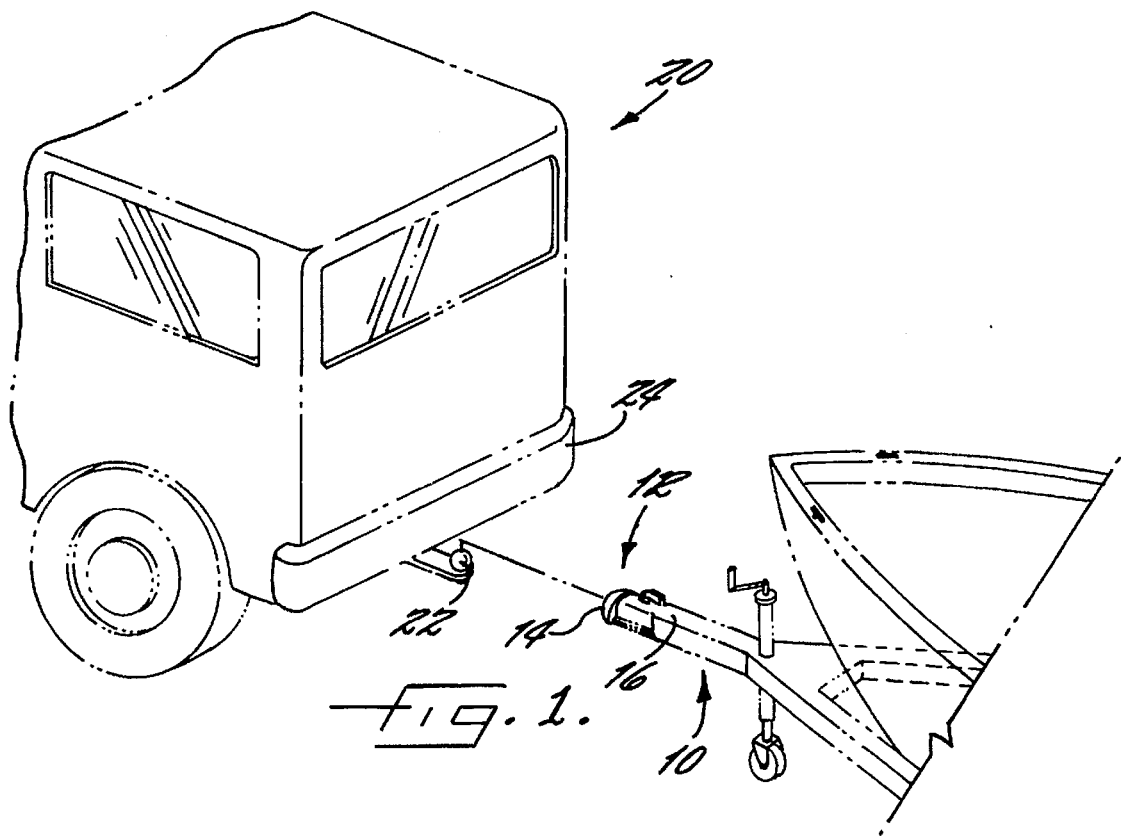
FIG. 1 is a perspective view illustrating a rear portion of a vehicle backing toward a trailer hitch housing of a trailer having a protective guard according to one embodiment of the present invention secured thereto.

Referring now to FIG. 1, a trailer hitch housing 10 having a protective guard 12 according to one embodiment of the present invention secured thereto is illustrated. The protective guard includes an impacting absorbing guard body 14 for covering at least a portion 16 of the outer surface of a longitudinal end portion of the trailer hitch housing which extends away from the trailer. As illustrated in more detail in FIG. 2, the longitudinal end portion of the trailer hitch housing includes an outwardly projecting, generally horizontal flange 18 extending about an exterior portion thereof.

Figure 2:
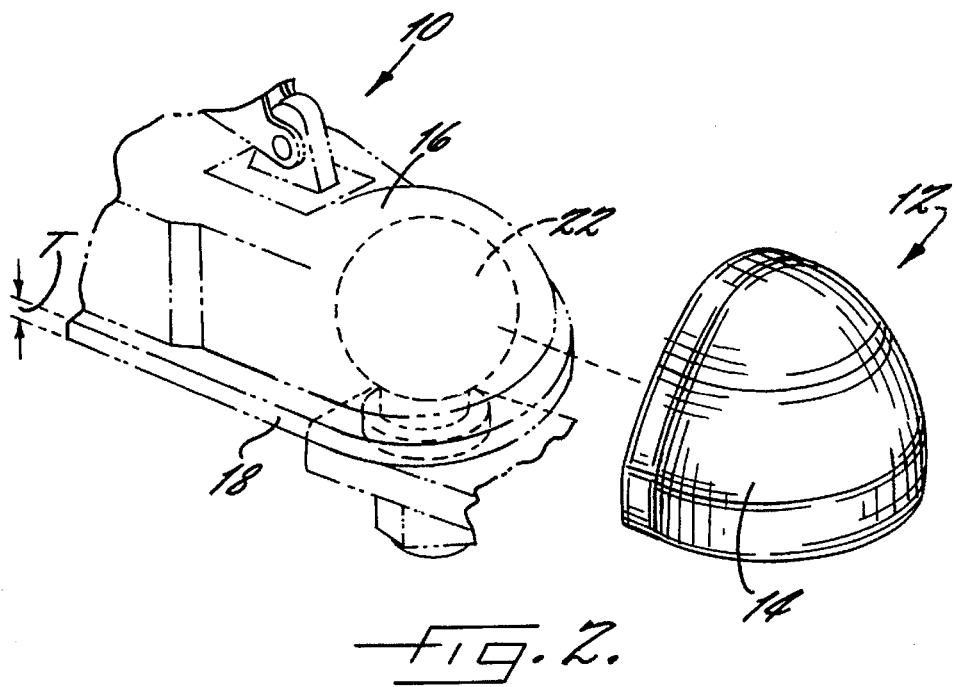
FIG. 2 is an exploded perspective view illustrating the longitudinal end portion of a trailer hitch housing and an associated protective guard according to one embodiment of the present invention.

While the protective guard 12 of the present invention is shown in FIGS. 1 and 2 in conjunction with a trailer hitch housing 10 having a predetermined shape and size, the protective guard and, in particular, the impact absorbing guard body is preferably capable of elastically deforming to a plurality of different shapes to thereby adaptively cover at least a portion of the longitudinal end portions 16 of a plurality of trailer hitch housings having a variety of different shapes and sizes as explained in detail hereinafter.

The impact absorbing guard body 14 is preferably comprised of a compressible, resilient elastomeric material, such as polyurethane of various forms, such as TENPREME™ polyurethane, rubber, silicone elastomers, artificial rubbers including EDPM and other olefin-based elastomers, and the like. The elastomeric material forming the guard body of one embodiment preferably has a Shore hardness of between about 40 durometers and about 90 durometers and, more preferably, has a Shore hardness of between about 60 durometers and about 65 durometers. In one advantageous embodiment, the guard body is comprised of a compressible, resilient material which does not significantly degrade upon exposure to ultraviolet light and which is relatively insensitive to temperature fluctuations. In other words, the compressible, resilient material which forms the guard body is preferably capable of weathering an outdoor environment without significant degradation. One such exemplary material from which the guard body can be formed is TENPREME™ polyurethane. In addition, the guard body can be formed by molding and, more preferably, by injection molding. However, other methods of forming the guard body of the present invention can be employed without departing from the spirit and scope of the present invention.

By being formed of a compressible, resilient material, the guard body 14 is capable of cushioning the impact of a vehicle 20 with at least one trailer hitch housing 10. In particular, a vehicle can be backed toward the trailer hitch housing as illustrated in FIG. 1. Preferably, the vehicle is backed toward the trailer hitch housing until a hitch 22, secured to the bumper 24 of the vehicle, is aligned with a female coupling element defined by the trailer hitch housing. Since the impacting absorbing guard body of the protective guard 12 of the present invention covers the portion of the outer surface of the longitudinal end portion 16 of the trailer hitch housing which the bumper of the vehicle may contact during trailer coupling operations, any impact of the vehicle with the trailer hitch housing will be cushioned. Therefore, the protective guard of the present invention protects the vehicle and, in particular, the bumper of the vehicle from damage due to the impact. Accordingly, the bumper of the vehicle is not marred, such as by denting or scratching, and the appearance and value of the vehicle is not impaired by the impact of the vehicle with the trailer hitch housing.

Advantageously, the guard body 14 is a compliant guard body formed of an elastomeric material capable of elastically deforming to a plurality of different shapes. The plurality of different shapes of the compliant guard body match respective ones of a plurality of different predetermined shapes of the outer surfaces of the longitudinal end portions 16 of a plurality of trailer hitch housings 10. Accordingly, the compliant guard body is capable of adaptively covering at least a portion of the longitudinal end portions of a plurality of trailer hitch housings having a variety of different shapes. A single protective guard can therefore cover at least a portion of the longitudinal end portions of a number of trailer hitch housings having different shapes. The guard body can be adapted to elastically deform to a plurality of shapes in various ways, such as by selecting the wall thickness, the specific elastomeric material and the degree of curvature of the guard body (typically 180° or less), so that the guard body can match the various spherical curvature portions of a plurality of trailer hitch housings.

The guard body 14 includes an exterior surface 26 as illustrated in FIGS. 2 and 3 for contacting the bumper 24 of a vehicle 20 during trailer coupling operations to protect the vehicle from inadvertent damage. The guard body also includes a concave inner surface 28 having a shape and a size which are selected to match the predetermined shape and size, respectively, of at least a portion of the longitudinal end portion 16 of the trailer hitch housing 10.

The guard body 14 of the present invention covers the longitudinal end portion 16 of the trailer hitch housing 10 since it is the longitudinal end portion which typically causes or creates the damage to the bumper 24 of the towing vehicle 20. In addition, even though trailer hitch housing can have a variety of different shapes and configurations depending upon the type and load requirements of the trailer, the longitudinal end portions of each of these trailer hitch housings are generally similar, if not identical. Thus, the protective guard 12 of the present invention can minimize, if not eliminate, damage which would have been caused by a number of different types of trailer hitch housings without requiring a substantial change to the trailer hitch housing and without any change to the bumper or to the hitch 22.

As illustrated in FIG. 3, the impact absorbing guard body 14 includes an arcuate slot 30 formed in the concave inner surface 28 of the guard body and extending inwardly to the guard body from the inner surface thereof. The arcuate slot is adapted to receive and cover at least a portion of the outwardly extending flange 18.

As illustrated in FIGS. 2 and 3, the arcuate slot 30 of the impact absorbing guard body 14 of one embodiment has a predetermined width W which is at least as small as the thickness T of the outwardly projecting flange 18. Thus, the guard body and, more particularly the sidewalls defining the arcuate slot will frictionally engage at least a portion of the outwardly extending flange so as to secure the guard body to the longitudinal end portion 16 of the trailer hitch housing 10. Although the predetermined width of the arcuate slot of this embodiment is at least as small as the thickness of the outwardly projecting flange, the arcuate slot defined by the guard body can receive the outwardly extending flange due, at least in part, to the compressible and resilient material forming the guard body which allows the guard body to flex and to thereby widen the arcuate slot to receive and frictionally engage the outwardly projecting flange.

The protective guard 12 of one embodiment of the present invention includes an adhesive disposed between the guard body 14 and the outer surface of at least a portion of the longitudinal end portion 16 of the trailer hitch housing 10. Upon curing of the adhesive, the protective guard is secured to the trailer hitch housing regardless of whether the arcuate slot 30 frictionally engages the outwardly extending flange 18. Thus, while the protective guard can include both a guard body having an arcuate slot having a predetermined width W at least as small as the thickness T of the outwardly projecting flange and an adhesive for further securing the guard body to the trailer hitch housing, the protective guard can include an adhesive for securing the guard body to the trailer hitch housing even though the arcuate slot has a predetermined width which is greater than the thickness of the outwardly projecting flange.

As illustrated in FIG. 4, the impact absorbing guard body 12 of one embodiment is capable of covering a predetermined arcuate portion of the outer surface of the longitudinal end portion 16 of the trailer hitch housing 10. In one advantageous embodiment, the arcuate portion defines an arc angle 32 of about 180°. As also illustrated in FIG. 4, the longitudinal end portion of the trailer hitch housing can define a longitudinal axis 34. In this embodiment, the predetermined arcuate portion of the outer surface of the longitudinal end portion of the trailer hitch housing which the guard body is capable of covering can be centered about the longitudinal axis. By covering those portions of the longitudinal end portion of the trailer hitch housing which extend about 90° in each direction from the longitudinal axis defined by the trailer hitch housing, the vehicle 20 is protected from inadvertent damage due to impact of the vehicle with the trailer hitch housing, even in instances which the vehicle is turned with respect to the trailer and, more particularly, with respect to the longitudinal axis defined by the trailer hitch housing.

In addition to the arcuate slot 30, the concave inner surface 28 of the guard body 12 can define at least one recessed portion 36 extending inwardly into the guard body from the inner surface thereof. As illustrated in FIG. 3, the at least one recessed portion can include a plurality of recessed portions extending inwardly to the guard body from the inner surface thereof. As also illustrated in FIG. 3, the plurality of recessed portions can define a plurality of ribs 38, such as a plurality of orthagonally-oriented ribs, extending between respective ones of the plurality of recessed portions.

Due to the recessed portions 36 defined by the concave inner surface 28 of the protective guard 12, the compressibility of the guard body 14 is enhanced. In particular, the recessed portions extending inwardly into the guard body from the inner surface thereof permit the exterior surface 26 of the guard body to flex inwardly, into a corresponding recessed portion, upon contact, such as upon impact, with a vehicle 20. In addition, the recessed portions can receive or be filled with adhesive during the process of securing the protective guard to the longitudinal end portion 16 of a trailer hitch housing 10 such that the adhesion of the protective guard to the trailer hitch housing can also be enhanced.

Accordingly, the protective guard 12 of the present embodiment effectively protects a vehicle 20 from inadvertent damage occasioned by impacting a trailer hitch housing 10, such as during trailer coupling operations. Therefore, the bumper 24 of the vehicle will not be marred, such as by being scratched or dented, and the resulting appearance of the vehicle will be maintained, thereby protecting the investment of the vehicle's owner.

In addition to protecting against damage to a vehicle 20 during trailer coupling operations, the protective guard 12 of the present invention can remain secured to at least a portion of the longitudinal end portion 16 of the trailer hitch housing 10 after the vehicle is unhitched and driven away from the trailer hitch housing. Thus, the protective guard does not affect the appearance of the towing vehicle. In addition, the protective guard can also prevent injuries to an individual walking near the trailer hitch housing who contacts or bumps into the longitudinal end portion thereof. In particular, the individual walking near a parked trailer may inadvertently contact the longitudinal end portion of a trailer hitch housing, such as with their shin. However, the protective guard of the present invention can cushion the impact of the individual contacting the trailer hitch housing and, in many instances, protect the individual from any resulting injury.

In the drawings and the specification, there has been set forth preferred embodiments of the invention and, although specific terms are employed, the terms are used in a generic and descriptive sense only and not for the purpose of limitation, the scope of the invention being set forth in the following claims.

That which is claimed is:

1. A protective guard for protecting against damage to a vehicle during a trailer coupling operation, the protective guard comprising:

an impact absorbing guard body for covering at least a portion of the outer surface of a longitudinal end portion of a trailer hitch housing extending away from the trailer, the longitudinal end portion of the trailer hitch housing including an outwardly projecting, generally horizontal flange extending about an exterior portion thereof, said guard body being comprised of a compressible, resilient material such that said guard body is capable of cushioning the impact of a vehicle with at least one trailer hitch housing having a predetermined shape and size during trailer coupling operations, thereby protecting the vehicle from inadvertent damage, said guard body comprising a concave inner surface having a shape and a size which are selected to match the predetermined shape and size, respectively, of at least a portion of the longitudinal end portion of the trailer hitch housing, and an arcuate slot formed in the concave inner surface of said guard body and extending inwardly into said guard body from the inner surface of said guard body, the arcuate slot having a predetermined width at least as small as the thickness of the outwardly projecting flange of the longitudinal end portion of the trailer hitch housing and being adapted to receive and frictionally engage at least a portion of the outwardly extending flange such that said guard body is secured to the longitudinal end portion of the trailer hitch housing and covers at least a portion of said outwardly extending flange, thereby allowing a hitch to engage a socket defined by the trailer hitch housing while the protective guard is in place.

2. A protective guard according to claim 1 wherein said guard body is formed of an elastomeric material capable of elastically deforming to a plurality of different shapes which match respective ones of a plurality of different predetermined shapes of the outer surfaces of the longitudinal end portions of a plurality of trailer hitch housings such that said guard body is capable of adaptively covering at least a portion of the longitudinal end portions of a plurality of trailer hitch housings having a variety of different shapes.

3. A protective guard according to claim 2 wherein the elastomeric material is a polyurethane material.

4. A protective guard according to claim 1 further comprising an adhesive disposed between said guard body and the outer surface of at least a portion of the longitudinal end portion of the trailer hitch housing for securing said guard body to the trailer hitch housing.

5. A protective guard according to claim 1 wherein said impact absorbing guard body is capable of covering a predetermined arcuate portion of the outer surface of the longitudinal end portion of the trailer hitch housing, said arcuate portion defining an arc angle of about 180°.

6. A protective guard according to claim 5 wherein the longitudinal end portion of the trailer hitch housing defines a longitudinal axis, and wherein said predetermined arcuate portion of the outer surface of the longitudinal end portion of the trailer hitch housing which said guard body is capable of covering is centered about the longitudinal axis.

7. A protective guard according to claim 1 wherein said concave inner surface of said guard body further defines at least one recessed portion extending inwardly into said guard body from the inner surface of said guard body for enhancing the compressibility of said guard body.

8. A protective guard according to claim 7 wherein the at least one recessed portion comprises a plurality of recessed portions extending inwardly into said guard body from the inner surface of said guard body to thereby define a plurality of ribs extending between respective ones of said plurality of recessed portions.

9. A protective guard for protecting against damage to a vehicle during a trailer coupling operation, the protective guard comprising:

an impact absorbing guard body for covering at least a portion of the outer surface of a longitudinal end portion of a trailer hitch housing extending away from the trailer, the longitudinal end portion of the trailer hitch housing including an outwardly projecting, generally horizontal flange extending about an exterior portion thereof, said guard body being comprised of a compressible, resilient material such that said guard body is capable of cushioning the impact of a vehicle with at least one trailer hitch housing having a predetermined shape and size during trailer coupling operations, thereby protecting the vehicle from inadvertent damage, said guard body comprising a concave inner surface having a shape and a size which are selected to match the predetermined shape and size, respectively, of at least a portion of the longitudinal end portion of the trailer hitch housing, and an arcuate slot formed in the concave inner surface of said guard body and extending inwardly into said guard body from the inner surface of said guard body, the arcuate slot being adapted to receive at least a portion of the outwardly extending flange of the longitudinal end portion of the trailer hitch housing; and an adhesive disposed between said guard body and the outer surface of at least a portion of the longitudinal end portion of the trailer hitch housing for securing said guard body to the trailer hitch housing such that said guard body is secured to the longitudinal end portion of the trailer hitch housing and covers at least a portion of said outwardly extending flange.

10. A protective guard according to claim 9 wherein said guard body is formed of an elastomeric material capable of elastically deforming to a plurality of different shapes which match respective ones of a plurality of different predetermined shapes of the outer surfaces of the longitudinal end portions of a plurality of trailer hitch housings such that said guard body is capable of adaptively covering at least a portion of the longitudinal end portions of a plurality of trailer hitch housings having a variety of different shapes.

11. A protective guard according to claim 9 wherein the arcuate slot formed in the concave inner surface of said guard body has a predetermined width at least as small as the thickness of the outwardly projecting flange of the longitudinal end portion of the trailer hitch housing and is adapted to frictionally engage at least a portion of the outwardly extending flange.

12. A protective guard according to claim 9 wherein said impact absorbing guard body is capable of covering a predetermined arcuate portion of the outer surface of the longitudinal end portion of the trailer hitch housing, said arcuate portion defining an arc angle of about 180°.

13. A protective guard according to claim 12 wherein the longitudinal end portion of the trailer hitch housing defines a longitudinal axis, and wherein said predetermined arcuate portion of the outer surface of the longitudinal end portion of the trailer hitch housing which said guard body is capable of covering is centered about the longitudinal axis.

14. A protective guard according to claim 9 wherein said concave inner surface of said guard body further defines at least one recessed portion extending inwardly into said guard body from the inner surface of said guard body for enhancing the compressibility of said guard body.

15. A protective guard according to claim 14 wherein the at least one recessed portion comprises a plurality of recessed portions extending inwardly into said guard body from the inner surface of said guard body to thereby define a plurality of ribs extending between respective ones of said plurality of recessed portions.

16. A protective guard for covering at least a portion of the outer surface of a longitudinal end portion of a trailer hitch housing extending away from a trailer to thereby protect against damage to a vehicle during a trailer coupling operation, the protective guard comprising:

a compliant guard body being formed of an elastomeric material capable of elastically deforming to a plurality of different shapes which match respective ones of a plurality of different predetermined shapes of the outer surfaces of the longitudinal end portions of a plurality of trailer hitch housings, the longitudinal end portion of each trailer hitch housing including an outwardly projecting, generally horizontal flange extending about an exterior portion thereof, said elastomeric material forming said compliant guard body also being formed of compressible, resilient material such that said compliant guard body is capable of cushioning the impact of a vehicle with each of sad plurality of trailer hitch housings during trailer coupling operations, thereby protecting the vehicle from inadvertent damage, and said compliant guard body comprising a concave inner surface defining an arcuate slot extending inwardly into said compliant guard body from the inner surface thereof, the arcuate slot being adapted to receive at least a portion of the outwardly extending flange of the longitudinal end portion of each of said plurality of trailer hitch housings such that said compliant guard body is capable of adaptively covering at least a portion of the longitudinal end portions of a plurality of trailer hitch housings having a variety of different shapes, thereby allowing a hitch to engage a socket defined by the trailer hitch housing while the protective guard is in place.

17. A protective guard according to claim 16 wherein the arcuate slot formed in the concave inner surface of said compliant guard body has a predetermined width at least as small as the thickness of the outwardly projecting flange of the longitudinal end portion of at least one of the plurality of trailer hitch housings and is adapted to frictionally engage at least a portion of the outwardly extending flange.

18. A protective guard according to claim 16 further comprising an adhesive disposed between said compliant guard body and the outer surface of at least a portion of the longitudinal end portion of the trailer hitch housing for securing said compliant guard body to the trailer hitch housing.

19. A protective guard according to claim 16 wherein said compliant guard body is capable of covering a predetermined arcuate portion of the outer surface of the longitudinal end portion of each trailer hitch housing, said arcuate portion defining an arc angle of about 180°.

20. A protective guard according to claim 19 wherein the longitudinal end portion of each trailer hitch housing defines a longitudinal axis, and wherein said predetermined arcuate portion of the outer surface of the longitudinal end portion of the trailer hitch housing which said compliant guard body is capable of covering is centered about the longitudinal axis.

21. A protective guard according to claim 16 wherein said concave inner surface of said compliant guard body further defines at least one recessed portion extending inwardly into said guard body from the inner surface of said guard body for enhancing the compressibility of said guard body.

22. A protective guard according to claim 21 wherein the at least one recessed portion comprises a plurality of recessed portions extending inwardly into said compliant guard body from the inner surface of said guard body to thereby define a plurality of ribs extending between respective ones of said plurality of recessed portions.

* * * * *